United States Patent [19]
Mizutani et al.

[11] Patent Number: 5,946,290
[45] Date of Patent: *Aug. 31, 1999

[54] TAMPER-PROOF LID LOCK IN DISC CARTRIDGE

[75] Inventors: Hikaru Mizutani, Mino; Kenji Ohta, Otokuni-gun, both of Japan

[73] Assignee: Hitachi Maxell, Ltd., Osaka-fu, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/815,001

[22] Filed: Mar. 14, 1997

[30] Foreign Application Priority Data

Mar. 15, 1996 [JP] Japan ................................ 8-087146

[51] Int. Cl.⁶ .................................................. G11B 23/03
[52] U.S. Cl. ...................... 369/291; 360/133; 206/308.1; 206/387.11
[58] Field of Search ............................ 369/291; 360/132, 360/133; 206/308.1, 308.2, 308.3, 387.11

[56] References Cited

U.S. PATENT DOCUMENTS

| | | | |
|---|---|---|---|
| 4,564,878 | 1/1986 | Weavers et al. | 360/132 |
| 5,093,823 | 3/1992 | Ouwerkerk et al. | 369/291 |
| 5,150,354 | 9/1992 | Iwata et al. | 369/291 |
| 5,285,918 | 2/1994 | Weisburn et al. | 220/265 |
| 5,445,265 | 8/1995 | Herr et al. | 206/308.1 |
| 5,796,713 | 8/1998 | Tanaka | 369/291 |

FOREIGN PATENT DOCUMENTS

| | | |
|---|---|---|
| 0368347 A2 | 5/1990 | European Pat. Off. |
| 0768664 A1 | 4/1997 | European Pat. Off. |
| 97/11463 A1 | 3/1997 | WIPO |

Primary Examiner—William J. Klimowicz
Attorney, Agent, or Firm—Birch, Stewart, Kolasch & Birch, LLP

[57] ABSTRACT

A disc cartridge for containing therein a disc-shaped medium which includes a generally flattened disc casing having a disc chamber defined therein for accommodating the disc-shaped medium and also having an access opening leading into the disc chamber, a lid structure supported by the disc casing at a position adjacent the access opening for movement between a closed position, in which the access opening is closed, and an opened position, and a lid lock interposed between the disc casing and the lid structure for locking the lid structure in the closed position. The lid lock includes a removable lock piece having first and second spaced functional parts. The first functional part has a breakable region through which the removable lock piece is connected with a portion of one of the disc casing and the lid structure, and the second functional part is engageable with a portion of the other of the disc casing and the lid structure to retain the lid structure in the closed position. The lid structure can be moved from the closed position towards the opened position only when and after the removable lock piece is broken off along the breakable region by application of an external force thereto.

4 Claims, 3 Drawing Sheets

Fig.3
Fig.4
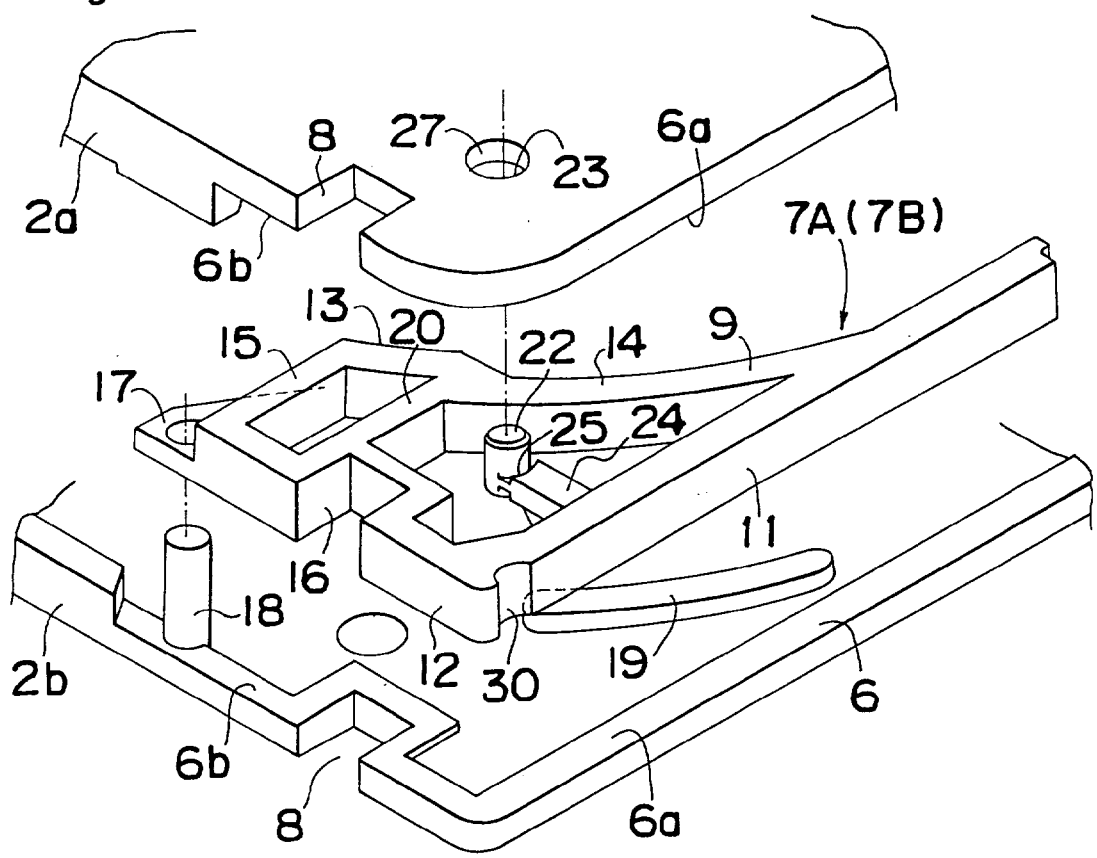
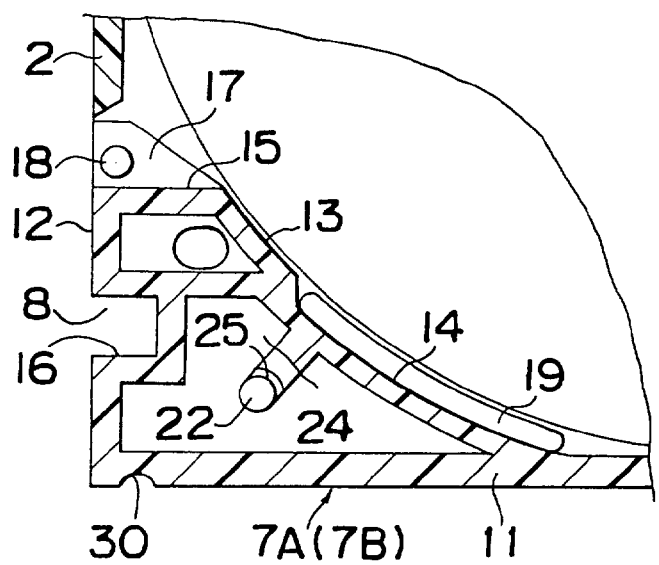

TAMPER-PROOF LID LOCK IN DISC CARTRIDGE

BACKGROUND OF THE INVENTION

1. Field of the Invention

The present invention generally relates to a disc cartridge of a generally rectangular flattened configuration for removably accommodating a disc-shaped optical or magnetooptical recording medium and, more particularly, to a tamper-proof lid structure for the disc cartridge for substantially semipermanently locking the lid to avoid an unauthorized removal or replacement of the disc-shaped recording medium.

2. Description of the Prior Art

The disc cartridge of the type referred to above is disclosed in, for example, the Japanese Laid-open Patent Publication No. 5-243626, published in 1994. According to this publication, the disc cartridge comprises a generally rectangular flattened casing having an access opening defined at a rear end thereof so as to extend over the entire width thereof. This known disc cartridge also includes a generally elongated lid for selectively opening and closing the access opening to allow the disc-shaped recording medium, for example, the optical disc, to be removed from and inserted into the interior of the casing, respectively. In this known disc cartridge, since the difference between the width of the disc casing and the outer diameter of the disc-shaped recording medium within the disc casing is very small, the access opening is defined at a rear end of the disc casing and, on the other hand, the lid has an engagement wall formed integrally therewith to a shape similar to the shape of the access opening so that when and so long as the access opening is closed by the lid the engagement wall can be received within the disc cartridge through the access opening. This lid is pivoted at one end to one corner region at the rear end of the casing so that it can be swung 180° or more between opened and closed positions. The opposite end of the lid structure has an elastic lock pawl formed integrally therewith such that, when and so long as the lid is in the closed position, the elastic lock pawl can be engaged in an engagement hole defined in a side wall of the disc cartridge to lock the lid structure in a locked condition. To open the lid, a pin or the like must be inserted into the engagement hole to forcibly disengage the lock pawl from the engagement hole.

The capability of the lid being selectively opened and closed is necessitated to allow an "encased" optical disc, that is purchased, for example, in the form as accommodated within the disc casing, to be replaced with a different, "uncased" optical disc that is separately purchased without the disc casing. As is well known to those skilled in the art, certain optical disc recording and/or reproducing devices (players) require the use of a dedicated disc casing and, on the other hand, not only can optical discs for use therewith be available in the form as encased within such a dedicated disc casing, but they are also available in the form as uncased, that is, without the dedicated disc casing. If the "encased" optical disc has audio and/or video information such as, for example, music and/or computer application software, recorded thereon, the capability of the lid being selectively opened and closed in the dedicated disc casing makes it possible for the user to replace the encased optical disc with an "uncased" blank optical disc so that the user can record audio and/or video information on such blank optical disc on his or her own or at his or her will.

The capability of the lid being selectively opened and closed in the prior art disc cartridge often poses a problem. If the optical disc, regardless of whether it is an encased optical disc or whether it is an uncased optical disc, is improperly or disorderly handled or stored outside the disc casing, to such an extent as to have scratches and/or stubborn dirt on one or both surfaces thereof, such optical disc may be no longer useable for recording or reproducing audio and/or video information. Also, with the prior art disc cartridge, it may also happen that no one can discern at first sight if the disc cartridge he or she has happened to own is a quality product warranted by the manufacturer or if it contains an optical disc different from the original optical disc which ought to have been in it. Another possible problem with the prior art disc cartridge is that since the optical disc can easily be removed out of the disc casing, the optical disc is susceptible to tamper, i.e., information recorded on the optical disc may be forged or inadvertently or erroneously overwritten.

SUMMARY OF THE INVENTION

Accordingly, the present invention is intended to provide an improved disc cartridge comprising a disc casing of a design that enables the user to discern at first sight if the disc cartridge he or she has happened to own is a quality product warranted by the manufacturer or if it contains an optical disc different from the original optical disc which ought to have been in it.

Another important object of the present invention is to provide an improved disc cartridge of the type referred to above, which includes at least one lid lock operable to lock the lid in the closed position, but requiring a corresponding removable lock piece to be removed in order for the lid lock to unlock the lid from the closed position.

A further important object of the present invention is to provide an improved disc cartridge of the type referred to above, wherein the removable lock piece is concealed within the disc casing to avoid an unnecessary access thereto, but can be accessible only when the necessity arises.

To this end, the present invention in a broad aspect thereof provides a disc cartridge for containing therein a disc-shaped medium which comprises a generally flattened disc casing having a disc chamber defined therein for accommodating the disc-shaped medium and also having an access opening leading into the disc chamber, said access opening having a width sufficient to accommodate the outer diameter of the disc-shaped medium; a lid structure supported by the disc casing at a position adjacent the access opening for movement between closed and opened position, said lid structure when in the closed position closing the access opening; and a lid lock interposed between the disc casing and the lid structure for locking the lid structure in the closed position. The lid lock includes a removable lock piece having first and second spaced functional parts, the first functional part having a breakable region through which the removable lock piece is connected with a portion of one of the disc casing and the lid structure, and the second functional part being engageable with a portion of the other of the disc casing and the lid structure to retain the lid structure in the closed position. The lid structure can be moved from the closed position towards the opened position only when and after the removable lock piece is broken off along the breakable region by application of an external force thereto.

Preferably, the lid structure may include a lid body which, when the lid structure is in the closed position, occupies a substantial portion of the access opening delimited between a plane of the disc casing, where the access opening is defined, and a portion of the outer periphery of the disc-shaped medium closest to said plane. In such case, the removable lock piece is continued from the lid body through the breakable region, and a portion of the disc casing corresponding in position to the first functional part of the removable lock piece has an access hole defined therein for the application of the external force therethrough to the removable lock piece to break the latter off from the lid body along the breakable region. The second functional part of the removable lock piece is engaged with a portion of an peripheral surface defining the access hole when the lid structure is retained in the closed position.

In a specific embodiment of the present invention, the lid body is of a frame structure leaving at least one void space in the lid body that is delimited by a peripheral wall, and the removable lock piece is supported in a cantilever fashion so as to protrude into the void space by a portion of the peripheral wall through an arm having one end integral with that portion of the peripheral wall and the opposite end continued to the removable lock piece through the breakable region, said breakable region being a thin-walled region formed at a joint between the removable lock piece and the arm. The first functional part of the removable lock piece is situated within the access hole so that the user can gain access to the removable lock piece when the latter is desired to be broken off along the breakable thin-walled region.

According to the present invention, unless the removable lock piece is removed by breaking it along the breakable region, the lid is movable from the closed position towards the opened position. Accordingly, so long as the removable lock piece is visible to the user through the access hole defined in the disc casing, the user may be warranted that the optical disc accommodated therein is a quality product and is in no way tapered or forged.

BRIEF DESCRIPTION OF THE DRAWINGS

This and other objects and features of the present invention will become clear from the following description taken in conjunction with preferred embodiments thereof with reference to the accompanying drawings, in which like parts are designated by like reference numerals and in which:

FIG. 3 is an exploded view of the portion of the disc cartridge shown in FIG. 2B;

FIG. 4 is a view similar to FIG. 2B, showing a lid lock according to a second preferred embodiment of the present invention;

DETAILED DESCRIPTION OF THE EMBODIMENTS

Figure 1:
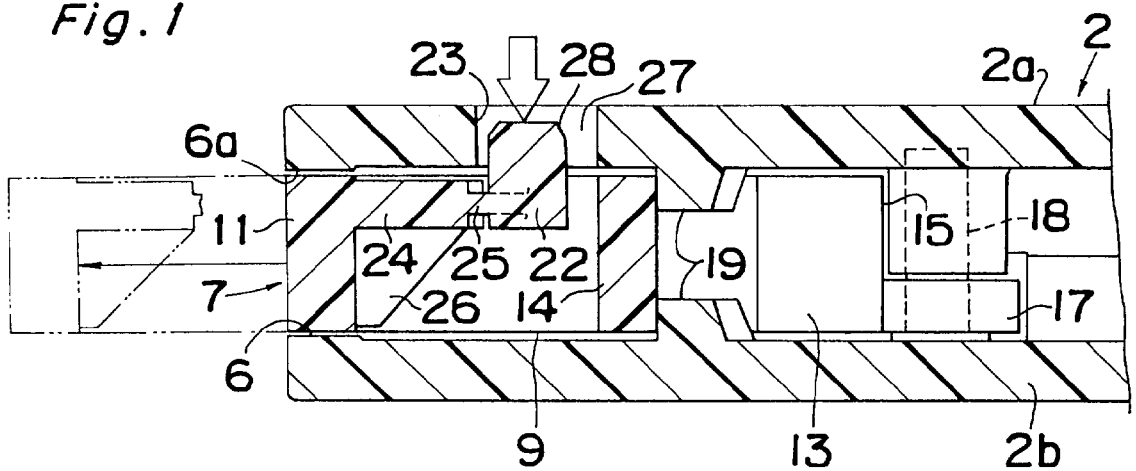
FIG. 1 is a fragmentary side sectional view of a disc cartridge according to a first preferred embodiment of the present invention, which is a cross-sectional view taken along the line A—A in FIG. 2B.
Figure 2A:
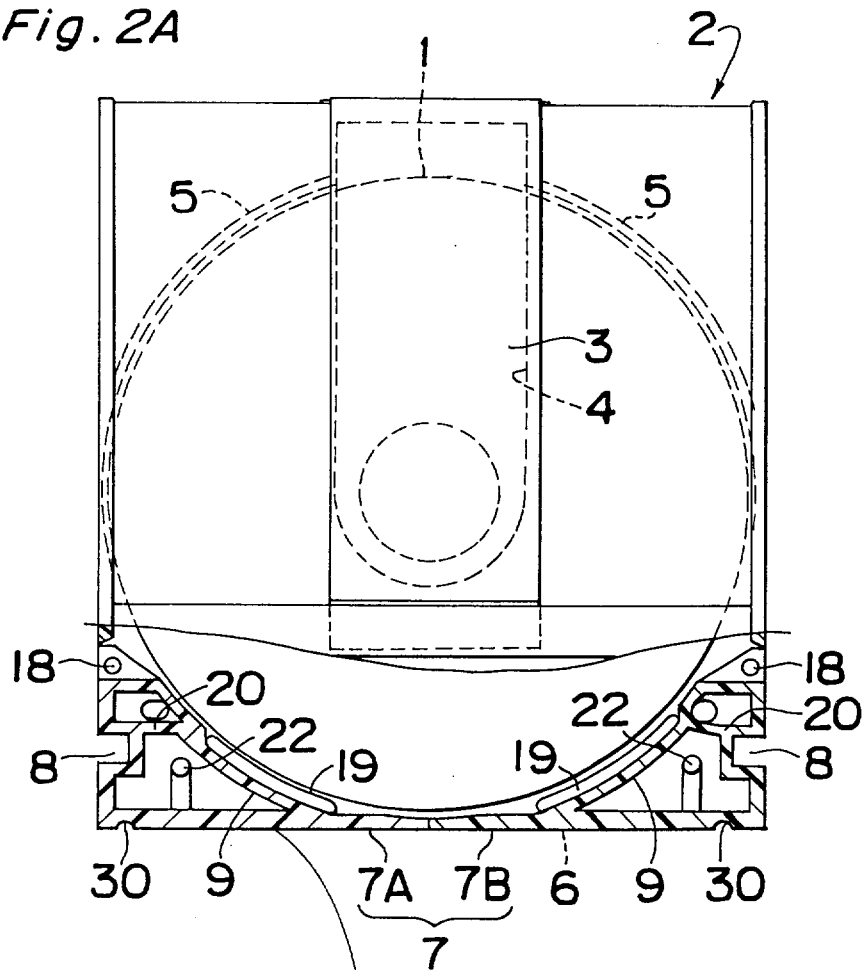
FIG. 2A is a partially sectional view, as viewed from top, of the disc cartridge.

FIGS. 1 to 3 pertain to a first preferred embodiment of the present invention. Referring first to FIG. 2A, a disc-shaped optical or magnetooptical recording medium is shown in the form of, for example, an optical disc 1 having first and second major surfaces opposite to each other with audio and/or video signals recorded or adapted to be recorded on each major surface thereof. This optical disc 1 is freely rotatably accommodated within a disc cartridge made of a moldable plastic material and including a generally rectangular flattened disc casing 2.

The disc casing 2 is made up of top and bottom panels 2a and 2b joined together by means of left and right side walls and a front end wall to thereby define a disc chamber therein. The disc casing 2 has a generally rectangular head access window 4 defined in each of the top and bottom panels so as to extend substantially parallel to the longitudinal axis of the disc cartridge from a central region towards the front end wall, and includes a slide shutter movable widthwise of the disc casing 2 for selectively opening and closing the head access windows 4 and normally biased by a biasing element towards a closed position to close the head access windows 4.

Respective front portions of the top and bottom panels 2a and 2b are formed with generally arcuate regulating ribs 5 positioned inside the disc casing 2 for restricting an arbitrary motion or play of the optical disc 1 within the disc casing 2.

An access opening 6 through which the optical disc 1 is inserted into or removed from the disc casing 2 is defined at a rear end of the disc casing 2 opposite to the front wall and is adapted to be selectively opened and closed by a generally elongated lid assembly 7 that is pivotally carried by the disc casing 2. Left and right side portions of the disc casing 2 adjacent the rear end thereof are formed respectively with generally U-shaped positioning recesses 8 recessed inwardly therefrom in respective directions opposite to each other. As best shown in FIG. 3, the access opening 6 includes a main open area 6a open at the rear end of the disc casing 2 and extending substantially widthwise thereof, and left and right side open areas 6b continued from the main open area 6a and open at left and right rear portions of the side walls of the disc casing 2 while encompassing the associated positioning recesses 8. Thus, the access opening 6, when viewed from above as shown in FIG. 2A, represents a generally U-shaped configuration extending from a rear end of one side wall of the disc casing 2 to a rear end of the opposite side wall of the disc casing 2 after having traversed the rear end of the disc casing 2.

The lid assembly 7 is also made of plastic material and is of a two-piece design including a first lid 7A and a second lid 7B. As best shown in FIG. 2A, each lid 7A and 7B is provided with a lid body 9 protruding into the disc casing 2 so as to occupy a space between the optical disc 1 and the access opening 6.

Figure 2B:
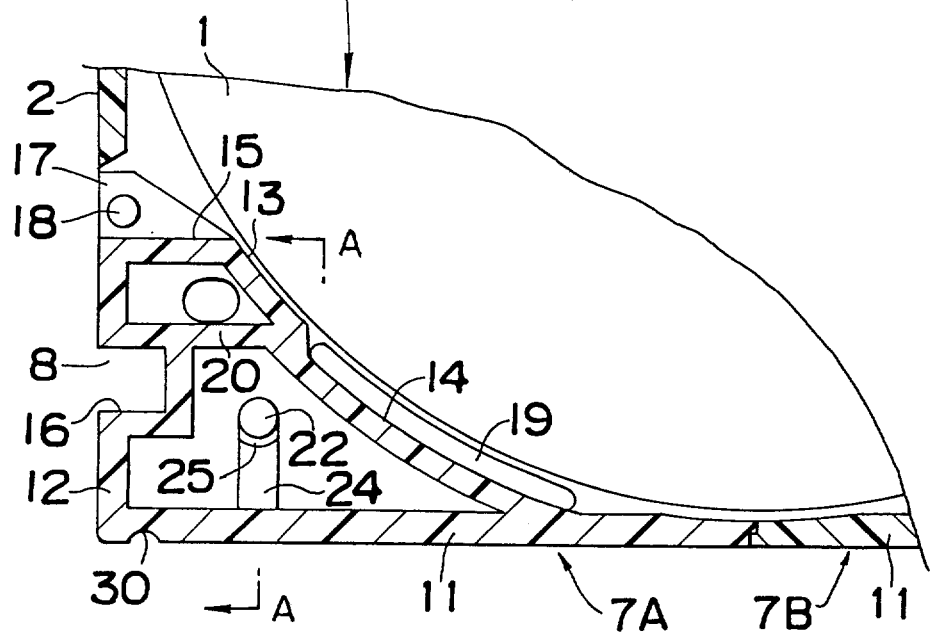
FIG. 2B is a fragmentary sectional view a portion of the disc cartridge of FIG. 2A on an enlarged scale, showing a lid lock.

Referring to FIGS. 2A, 2B and 3, the lid body 9 of each of the first and second lids 7A and 7B is of a generally trapezoidal shape including a rear wall 11 for closing a left half or right half of the main open area 6a of the access opening, a side wall 12 continued from a left or right end of the rear wall 11 for closing the left or right side open area 6b of the access opening 6, a front wall 15 continued perpendicularly from the side wall 12 so as to extend generally parallel to the rear wall 11, a regulating wall 13 of a curvature corresponding to the curvature of the outer periphery of the optical disc 1, an engagement wall 14 extending between the regulating wall 13 and the other end of the rear wall 11 and set back inwardly relative to the regulating wall 13, and a cross wall 20 extending generally parallel to the front wall 15 so as to connect the side wall 12 and the regulating wall 13 together.

Each lid body 9 of the structure described above is in the form of a frame structure leaving void spaces, one delimited by the rear wall 11, the side wall 12, the cross wall 20 and the engagement wall 14 and the other delimited by the side wall 12, the front wall 15, the regulating wall 13 and the cross wall 20, so that both the weight and the volume of the lid body 9 can be minimized. The side wall of each lid body 9 is formed with a cutout 16 of a shape similar to the corresponding positioning recess 8, and the front wall 15 of each lid body 9 is formed integrally with a bearing lug 17 protruding in a direction counter to the lid 7A or 7B.

The first and second lids 7A and 7B are pivotally supported by respective pivot pins 18 extending between the top and bottom panels 2a and 2b through the associated bearing lugs 17 so that the first and second lids 7A and 7B can pivot 90° C. or more in respective directions opposite to each other about the associated pivot pins 18 to thereby open or close the main open area 6a and the side open areas 6b simultaneously and, hence, the access opening 6. The pivot pins 18 described as extending between the top and bottom panels 2a and 2b may be integrally formed with either the top panel 2a or the bottom panel 2b so as to protrude towards the other. Also, in order to avoid any possible interference with insertion or removal of the optical disc 1 into or from the disc casing 2, the pivot pins 18 are positioned as close to the associated lateral side of the disc casing 2 as possible. A portion of the rear wall 11 of each lid body 9 adjacent the side wall 12 is formed with a recess 30 defined on an outer surface thereof and utilizable when the corresponding lid 7A or 7B is desired to be opened.

It is to be noted that when and so long as the lids 7A and 7B are held in the closed position, the regulating walls 13 in the respective lids 7A and 7B cooperate with the regulating ribs 5 to define a round space in which the optical disc 1 can be accommodated without allowing it to undergo an undue lateral displacement within the disc casing 2. Portions of inner surfaces of the top and bottom panels 2a and 2b which are, when the lids 7A and 7B are in the closed position, aligned with respective recesses left by the engagement walls 14 having been set back inwardly relative to the adjacent regulating walls 13 are formed with curved reinforcement ribs 19 as shown in FIGS. 2A and 3 to thereby reinforce those portions of the top and bottom panels 2a and 2b which tend to lack a sufficient physical strength. The reinforcement ribs 19 so formed concurrently serve as stoppers for defining the closed position of the lids 7A and 7B and, accordingly, when the lids 7A and 7B are shut to assume the closed position, the engagement walls 14 are brought into engagement with the respective reinforcement ribs 19, as clearly shown in FIG. 1, to thereby prevent the lids 7A and 7B from being purposefully or inadvertently pushed further into the disc casing 2 beyond the closed position.

As described above, the first and second lids 7A and 7B are of a substantially identical construction, except that the cross wall 20 in the first lid 7A has a shape different from the cross wall 20 in the second lid 7B.

The disc casing in accordance with the present invention may have at least one lid lock associated with one of the first and second lids for substantially semipermanently locking the associated lid in the closed position to thereby provide a visual indication that the product is quality warranted by the manufacturer, that is, the optical disc contained in the disc casing as manufactured has never been replaced in any way whatsoever. In the illustrated embodiment, however, two lid locks of a substantially identical construction are employed respectively for the first and second lids 7A and 7B, which will now be discussed.

Referring particularly to FIGS. 1 and 3, each of the lid locks includes a removable lock piece 22 within the void space in the associated lid body 9 that is delimited by the rear wall 11, the side wall 12, the cross wall 20 and the engagement wall 14. Each lid lock also includes an abutment 23 which is defined in a portion of the top panel 2a aligned with the removable lock piece 22 for engagement with the removable lock piece 22 and which, in the illustrated embodiment, is defined by a peripheral wall defining an access hole 27 formed in that portion of the top panel 2a so as to extend completely across the thickness of the top panel 2a.

The removable lock piece 22 associated with each lid 7A and 7B may be an integral part of the respective lid body 9 and is supported by the rear wall 11 in a cantilever fashion by means of an arm 24 that extends therefrom towards the cross wall 20 and into that void space. The arm 24 has one end integral with the rear wall 11 and the opposite end continued to the removable lock piece 22 through a breakable thin-walled region 25 along which the removable lock piece 22 can be separated by bending from the arm 24. The removable lock piece 22 so far illustrated is in the form of a cylindrical boss and is supported by the arm 24 with its longitudinal axis oriented perpendicular to the top panel 2a. Although not essential if the arm 24 can sufficiently resist to an external force which may be applied to the removable lock piece 22 as will be described later, the arm 24 so far shown is reinforced by a reinforcement angle 26 to avoid any possible fluctuation or bending of the arm 24, which angle 26 may be an integral part of the lid body 9.

The breakable thin-walled region 25 for each removable lock piece 22 may be defined by forming grooves, recessed inwardly from opposite surfaces of the arm 24, at a joint between the arm 24 and the removable lock piece 22 so as to leave a wall of a thickness so smaller than that of the arm 24 as to enable the removable lock piece 22 to be separated by bending from the arm 24. The grooves defining the breakable thin-walled region 25 are preferably curved to follow the curvature of the removable lock piece 22, but may extend straight in a widthwise direction of the arm 25. With the respective lid 7A and 7B held in the closed position as shown by the solid line in FIG. 1, one end, or a top end as viewed therein, of the associated removable lock piece 22 is situated within the access hole 27 so that, because of engagement between the top end of the removable lock piece 22 and the abutment 23, the respective lid 7A or 7B cannot be swung to open.

As best shown in FIG. 1, the top end of the removable lock piece 22 for each lid 7A and 7B has a peripheral edge chamfered at 28 so that when the removable lock piece 22 bends about the breakable thin-walled region 25 by the effect of an external force applied thereto through the access hole 27, it will not interfere with the peripheral surface of the access hole 27.

It will thus be readily understood that when the lids 7A and 7B are desired to be opened, an external pushing force must be applied by the use of any suitable tool such as, for example, a rod, pin or screw driver to the top end of each of the removable lock pieces 22 through the associated access hole 27 to allow the respective removable lock piece 22 to be bent to separate from the associated arm 24 along the corresponding breakable thin-walled region 25. The removable lock piece 22 so removed from the arm falls into that void space delimited by the rear wall 11, the side wall 12, the cross wall 20 and the engagement wall 14, but can be removed out of that void space when the associated lid 7A or 7B is opened.

Once the lids 7A and 7B are opened and the disc casing 2 is tilted, the optical disc 1 within the disc casing 2 can slide out of the disc casing 2. As a matter of course, the disc casing 2 must be tilted until an outer peripheral portion of the optical disc 1 within the disc casing 2 comes to be exposed to the outside and then the user should receive it on his or her hand. Following the procedure substantially reverse to that described above after the optical disc or a new optical disc has been inserted into the disc casing 2 through the access opening 6, the lids 7A and 7B can be closed to close the access opening 6.

In the foregoing embodiment described with reference to FIGS. 1 to 3, the arm 24 supporting the corresponding removable lock piece 22 has been shown as extending from the rear wall 11. However, in a second embodiment of the present invention shown in FIG. 4, the arm 24 is shown as extending from the engagement wall 14 in each of the lids 7A and 7B generally at right angles thereto or in a direction diagonally rearwardly as viewed in a direction of insertion of the disc cartridge into the disc player. As can readily understood from the second embodiment, the arm 24 for the support of the associated removable lock piece 22 may extend from one of any other walls 12, 13 or 30 all forming respective parts of the lid body 9 of each lid 7A and 7B depending on the layout of those walls forming the lid body 9.

Figure 5:
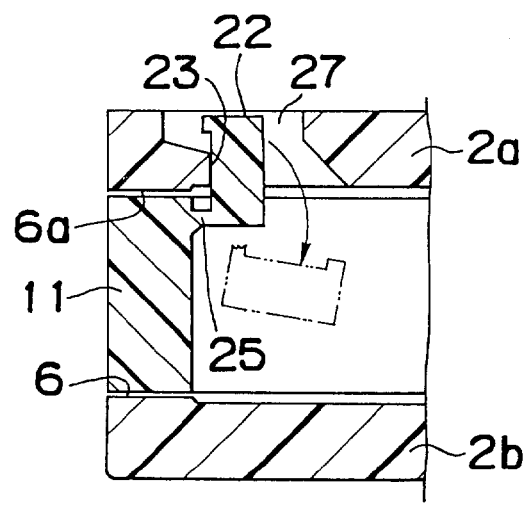
FIG. 5 is a fragmentary side sectional view of the disc cartridge, showing the lid lock according to a third preferred embodiment of the present invention.

A third preferred embodiment of the present invention is shown in FIG. 5. In any one of the foregoing embodiments, the removable lock piece 22 for each lid 7A and 7B has been described as carried by the respective arm 24 through the breakable thin-walled region 25. The use of the arm 24 and its associated part, that is, the reinforcement angle 26 may not be essential in the practice of the present invention and the removable lock piece 22 may be directly carried by the rear wall 11 (or one of any other walls 12, 13, 14 and 20 if desired) only through the breakable thin-walled region 25 as shown in FIG. 5.

According to the third embodiment of the present invention, each of the removable lock pieces 22 is so designed that it can be separated from the rear wall 11 by the application of a pulling force, rather than the pushing force required in any one of the foregoing embodiments, to allow the respective removable lock piece 22 to tile about the breakable thin-walled region 25 to eventually separate from the rear wall 11. In view of this, to allow the removable lock piece 22 to tilt clockwise, as viewed in FIG. 5, about the breakable thin-walled region 25, the access hole 27 is so formed as to extend slantwise sufficiently to accommodate the tilt of the removable lock piece 22 until the latter yields to a position within that void space. The removable lock piece 22 for each lid 7A and 7B used in the third embodiment of the present invention may have either a round cross-section or a rectangular cross-section.

It is to be noted that although the access hole 27 has been described as formed in the top panel 2a of the disc casing 2, those skilled in the art will readily appreciate that it may be formed in the bottom panel 2b, in which case the removable lock piece 22 has to be turned upside down relative to that shown in and described to allow one end of the removable lock piece 22 remote from the thin-walled region 25 to be situated within the access hole.

In any one of the foregoing embodiments, each removable lock piece 22 has been shown as an integral part of the lid body 9 of each lid 7A and 7B. However, in accordance with the concept of the present invention, it may be an integral part of either the top panel 2a or the bottom panel 2b of the disc casing 2.

Figure 6:
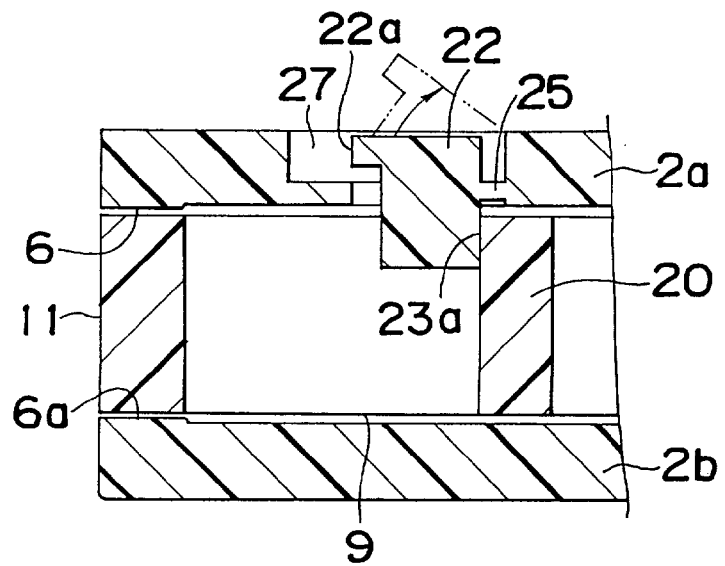
FIG. 6 is a fragmentary side sectional view of the disc cartridge, showing the lid lock according to a fourth preferred embodiment of the present invention.

In a fourth preferred embodiment of the present invention shown in FIG. 6, each removable lock piece 22 is shown as an integral part of the top panel 2a. Specifically, the removable lock piece 22 has a generally intermediate portion continued from the peripheral wall of the access hole 27 through the breakable thin-walled region 25 and is so positioned that a lower end thereof as viewed in FIG. 6 is held in contact with an abutment 23a, defined in a part of the cross wall 20, to keep the respective lid 7A and 7B in the closed position. The top end of the removable lock piece 22 is formed with a brim 22a protruding therefrom at right angles to the longitudinal axis of the lock piece 22 to facilitate engagement with a finger of the user. In this embodiment, to break the removable lock piece 22, an external pulling force has to be applied to the removable lock piece 22, with the user's finger engaged to the brim 22a, to allow the removable lock piece 22 to escape out of the disc casing 2 through the access hole 27 in the top panel 2a and then to separate from the peripheral wall of the access hole 27.

It is to be noted that depending on the position of the peripheral wall of the access hole 27 from which the removable lock piece 22 is continued, a part of one of any other walls 14 and 14 than the cross wall 20 may be utilized as the abutment 23.

From the foregoing description of the present invention, it has now become clear that so long as at least one of the removable lock pieces 22 remains unremoved, the presence of such remaining lock piece 22 can provide a visual indication that the product is quality warranted by the manufacturer, that is, the optical disc contained in the disc casing as manufactured has never been replaced in any way whatsoever. The presence of the visual indication would be enhanced if an end face of each removable lock piece 22 that is exposed to the outside of the disc casing 2 is painted or labelled in a color different from that of the exterior surface of the disc casing 2.

Although the present invention has been described in connection with the preferred embodiments thereof with reference to the accompanying drawings, it is to be noted that various changes and modifications are apparent to those skilled in the art. For example, in place of the use of the two lids 7A and 7B to close the access opening 6, the use of a single lid is equally possible. Where the first and second lids 7A and 7B are used to close the access opening 6, either one of the first and second lids 7A and 7B may be a slide lid that may be slidably supported for selectively opening and closing a corresponding part of the access opening 6. The access opening 6 may be opened in one direction either leftward or rightward of the disc casing 2.

Also, although in any one of the foregoing embodiments the top end of the removable lock piece 22 for each lid 7A and 7B has been described as situated within the access hole 27, it may protrude outwardly of the disc casing 2 through the access hole 27.

Again, although the lid structure 9 of each lid 7A and 7B has been shown as having the void spaces, it may have a transverse partition wall lying substantially parallel to any one of the top and bottom panels 2a and 2b and dividing each void spaces into upper and lower compartments.

Therefore, such changes and modifications are to be understood as included within the scope of the present invention as defined by the appended claims, unless they depart therefrom.

What is claimed is:

1. A disc cartridge for containing therein a disc-shaped medium; said disc cartridge comprising:

a generally flattened disc casing having a disc chamber defined therein for accommodating the disc-shaped medium and also having an access opening leading into the disc chamber, said access opening having a width sufficient to accommodate the outer diameter of the disc-shaped medium;

a lid structure supported by the disc casing at a position adjacent the access opening for movement between a closed and opened position, said lid structure when in the closed position closing the access opening;

a lid lock interposed between the disc casing and the lid structure for locking the lid structure in the closed position; and said lid lock including a removable lock piece having first and second spaced functional parts, the first functional part having a breakable region through which the removable lock piece is connected with a portion of one of the disc casing and the lid structure, and the second functional part being engageable with a portion of the other of the disc casing and the lid structure to retain the lid structure in the closed position;

wherein the lid structure can be moved from the closed position towards the opened position only when and after the removable lock piece is broken off along the breakable region by application of an external force thereto;

wherein the removable lock piece is completely detached from the disc casing when broken and can fall into the disc casing prior to opening the lid structure upon application of said external force, and can fall out of the disc casing when the lid structure is opened;

wherein the lid structure includes a lid body which, when the lid structure is in the closed position, occupies a substantial portion of the access opening delimited between a plane of the disc casing, where the access opening is defined, and a portion of the outer periphery of the disc-shaped medium closest to said plane;

wherein said removable lock piece is continued from the lid body through the breakable region;

wherein a portion of the disc casing corresponding in position to the first functional part of the removable lock piece has an access hole defined therein, through which hole the external force can be applied to the removable lock piece to break the latter off from the lid body along the breakable region, and second functional part of the removable lock piece being engaged with a portion of a peripheral surface defining the access hole when the lid structure is retained in the closed position;

wherein the lid body is of a frame structure leaving at least one void space in the lid body that is delimited by a peripheral wall;

wherein the removable lock piece is supported in a cantilever fashion so as to protrude into the void space by a portion of the peripheral wall through an arm having one end integral with that portion of the peripheral wall and the opposite end continued to the removable lock piece through the breakable region, said breakable region being a thin-walled region formed at a joint between the removable lock piece and the arm; and wherein the first functional part of the removable lock piece is situated within the access hole.

2. The disc cartridge as in claim 1, wherein the removable lock piece carried by the lid body through the arm by way of the breakable thin-walled region, a top end face of the removable lock piece is set back a slight distance inwardly from the plane of an upper surface of a top panel of the casing, thereby avoiding the possibility that the removable lock piece may be accidentally or inadvertently broken.

3. The disc cartridge as in claim 1, wherein the removable lock piece has a peripheral edge chamfered, whereby when the removable lock piece bends about the breakable thin walled region by the effect of an external force applied thereto through the access hole, the removable lock piece will not interfere with a peripheral surface of the access hole.

4. The disc cartridge of claim 1, wherein an end face of the removable lock piece that is to be exposed to outside the disc casing is painted or labeled in a color different from that of an exterior surface of the disc casing.

* * * * *